(12) United States Patent
Ringer et al.

(10) Patent No.: US 9,795,815 B2
(45) Date of Patent: Oct. 24, 2017

(54) CONTROL VALVE ASSEMBLY

(71) Applicant: Globe Fire Sprinkler Corporation, Standish, MI (US)

(72) Inventors: Yoram Ringer, Providence, RI (US); Stephen J. Meyer, Chester Springs, PA (US); Thomas Edwin Archibald, Midland, MI (US)

(73) Assignee: GLOBAL FIRE SPRINKLER CORPORATION, Standish, MI (US)

( * ) Notice: Subject to any disclaimer, the term of this patent is extended or adjusted under 35 U.S.C. 154(b) by 0 days.

(21) Appl. No.: 15/298,758

(22) Filed: Oct. 20, 2016

(65) Prior Publication Data

US 2017/0113083 A1    Apr. 27, 2017

Related U.S. Application Data

(60) Provisional application No. 62/244,444, filed on Oct. 21, 2015.

(51) Int. Cl.
*A62C 35/58*  (2006.01)
*A62C 35/68*  (2006.01)
(Continued)

(52) U.S. Cl.
CPC .............. *A62C 35/68* (2013.01); *A62C 35/60* (2013.01); *A62C 35/645* (2013.01);
(Continued)

(58) Field of Classification Search
CPC ..... A62C 35/60; A62C 35/605; A62C 35/645; A62C 35/68; F16K 15/033; F16K 15/181; F16K 37/0041; Y10T 137/7903
(Continued)

(56) References Cited

U.S. PATENT DOCUMENTS

| | | |
|---|---|---|
| RE11,988 E | 5/1902 | Gray |
| 1,359,327 A | 11/1920 | Campbell |
| 1,699,706 A * | 1/1929 | Loepsinger .......... A62C 35/645 |
| | | 137/533 |

(Continued)

FOREIGN PATENT DOCUMENTS

| | | |
|---|---|---|
| GB | 322642 A | 12/1929 |
| GB | 358724 A | 10/1931 |

OTHER PUBLICATIONS

Int'l Search Report and Written Opinion dated Jan. 17, 2017 in Int'l Application No. PCT/US16/57949.

*Primary Examiner* — Alexander Valvis
(74) *Attorney, Agent, or Firm* — Panitch Schwarze Belisario & Nadel LLP (57) ABSTRACT

A control valve assembly includes a valve body having inlet and outlet ends, and an endless valve seat therebetween. A clapper disk is pivotably mounted within the valve body, and is pivotable between a sealingly closed position and an open position according to a pressure differential across the clapper disk. A U-shaped arm is rotatably supported in the valve body, and rotatable between a first position, wherein a bight of the U-shaped arm is positioned out of an operational range of movement of the clapper disk such that the clapper disk is freely movable between the open and closed positions thereof, and a second position, wherein the bight of the U-shaped arm engages and maintains the clapper disk in the sealingly closed position thereof. A selectively rotatable control arm operatively coupled with the U-shaped arm and utilized to move the U-shaped arm between the first and second positions thereof.

20 Claims, 10 Drawing Sheets

(51) Int. Cl.
*F16K 15/03* (2006.01)
*A62C 35/60* (2006.01)
*F16K 15/18* (2006.01)
*A62C 35/64* (2006.01)
*F16K 37/00* (2006.01)

(52) U.S. Cl.
CPC .......... *F16K 15/033* (2013.01); *F16K 15/181* (2013.01); *F16K 37/0041* (2013.01)

(58) Field of Classification Search
USPC ...... 169/19–21; 137/527, 527.2; 251/90, 91, 251/95–97
See application file for complete search history.

(56) References Cited

U.S. PATENT DOCUMENTS

| | | | |
|---|---|---|---|
| 1,765,840 A | | 6/1930 | Lewis |
| 1,947,309 A | | 2/1934 | Rowley |
| 2,196,592 A | * | 4/1940 | Lowe ................... A62C 35/645 169/17 |
| 3,809,112 A | | 5/1974 | Herbello |
| 3,883,111 A | | 5/1975 | Jourdan |
| 3,897,804 A | | 8/1975 | Buck et al. |
| 4,991,655 A | | 2/1991 | McHugh |
| 5,439,028 A | | 8/1995 | Meyer et al. |
| 8,128,058 B2 | * | 3/2012 | Quinn ................... F16K 1/2028 251/288 |
| 9,265,980 B2 | | 2/2016 | Johnson |
| 2006/0260822 A1 | | 11/2006 | Cabral |
| 2007/0000671 A1 | | 1/2007 | Reilly et al. |
| 2009/0139734 A1 | | 6/2009 | Blease et al. |

* cited by examiner

CONTROL VALVE ASSEMBLY

CROSS-REFERENCE TO RELATED APPLICATIONS

This application claims priority from U.S. Provisional Patent Application No. 62/244,444, titled "Multipurpose Modular Valve Assemblies", filed on Oct. 21, 2015, the entire contents of which are incorporated by reference herein.

BACKGROUND OF THE INVENTION

The present invention relates to fluid flow valves and, for example, to valves typically used to monitor and control water released to downstream sprinklers of fire suppression sprinkler systems.

Codes typically require fire suppression sprinkler systems designed for protection of commercial and non-commercial properties to include at least a check valve, a control valve and a flow switch. The most commonly used water flow detector switch (or simply "flow switch") for wet fire protection sprinkler systems employ a flexible paddle or vane. The flow switch is mounted to a length of pipe with the paddle extended across the flow path, the paddle being displaced by water flowing through the pipe. In installation in water supply systems, such flow switches are similar to valves having ends of the pipe configured for attachment between other lengths of pipe and/or with adjoining valve(s) or other sprinkler system component(s). Such flow switches are available individually from various commercial suppliers, each mounted in its own conduit, typically iron or steel, which are stacked together during installation of such sprinkler systems. The largest sprinkler system valves (eight inches or more in diameter) typically weigh several hundred pounds with their conduits and accessories. The resulting stacks can be very large, very heavy and relatively expensive.

BRIEF SUMMARY OF THE INVENTION

Briefly stated, one aspect of the present invention is directed to a fire protection system. The system comprises at least one control valve assembly comprising a valve body having an inlet end, an outlet end, and an endless valve seat therebetween. A clapper disk is pivotably mounted within the valve body and is pivotable between a closed position and an open position according to a pressure differential across the clapper disk. The clapper disk is in sealed engagement with the valve seat in the closed position thereof and is spaced away from the valve seat in the open position thereof. A U-shaped arm is rotatably supported in the valve body, and is rotatable between first and second positions. In the first position, a bight of the U-shaped arm is positioned out of an operational range of movement of the clapper disk such that the clapper disk is freely movable between the open and closed positions thereof according to the pressure differential across the clapper disk. In the second position, the bight of the U-shaped arm engages and maintains the clapper disk in the closed position thereof irrespective of the pressure differential across the clapper disk. A selectively rotatable control arm operatively coupled with the U-shaped arm moves the U-shaped arm between the first and second positions thereof. The system further comprises a wet standpipe, the inlet end of the valve body being fluidly connected with the standpipe; and at least one sprinkler downstream of the at least one control valve assembly, the at least one sprinkler being fluidly connected with the outlet end of the valve body.

Another aspect of the present invention is directed to a control valve assembly comprising a valve body having an inlet end, an outlet end, and an endless valve seat therebetween. A clapper disk is pivotably mounted within the valve body and is pivotable between a closed position and an open position according to a pressure differential across the clapper disk. The clapper disk is in sealed engagement with the valve seat in the closed position thereof and is spaced away from the valve seat in the open position thereof. A U-shaped arm is rotatably supported in the valve body, and is rotatable between first and second positions. In the first position, a bight of the U-shaped arm is positioned out of an operational range of movement of the clapper disk such that the clapper disk is freely movable between the open and closed positions thereof according to the pressure differential across the clapper disk. In the second position, the bight of the U-shaped arm engages and maintains the clapper disk in the closed position thereof irrespective of the pressure differential across the clapper disk. A selectively rotatable control arm operatively coupled with the U-shaped arm moves the U-shaped arm between the first and second positions thereof.

BRIEF DESCRIPTION OF THE DRAWINGS

The following detailed description of a preferred embodiment of the invention will be better understood when read in conjunction with the appended drawings. It should be understood, however, that the disclosure is not limited to the precise arrangements and instrumentalities shown. In the drawings.

DETAILED DESCRIPTION OF THE INVENTION

Certain terminology is used in the following description for convenience only and is not limiting. The words "lower,"

"bottom," "upper" and "top" designate directions in the drawings to which reference is made. The words "inwardly," "outwardly," "upwardly" and "downwardly" refer to directions toward and away from, respectively, the geometric center of the modular valve assembly and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

It should also be noted that the terms "first," "second," "third" and the like may be used herein to modify various elements. These modifiers do not imply a spatial, sequential, or hierarchical order to the modified elements unless specifically stated. It should also be understood that the terms "about," "approximately," "generally," "substantially" and like terms, used herein when referring to a dimension or characteristic of a component of the invention, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Referring to the drawings in detail, wherein like numerals indicate like elements throughout, there is shown in FIGS. 1-10 a preferred embodiment of a modular control valve assembly, generally designated 1110. In the present embodiment, the control valve assembly 1110 is usable in the water supply portion of a fire protection sprinkler system upstream from the sprinklers. For example, in a multi-floor building sprinkler system, a wet standpipe 1 (shown schematically in FIG. 5) extends vertically through each of the floors, with a control valve assembly 1110 branching off of the wet standpipe 1 at each floor. A control valve assembly 1110 is positioned within each respective floor to control water flow from the wet standpipe 1 to the downstream sprinkler(s) 2 (also shown schematically in FIG. 5) on that floor, to allow the sprinkler system to be drained for testing and maintenance and to shut off the water flow at the end of an actual fire. As should be understood by those of ordinary skill in the art, however, the control valve assembly 1110 may also be employed in other wet systems as well as in dry systems.

Figure 9:
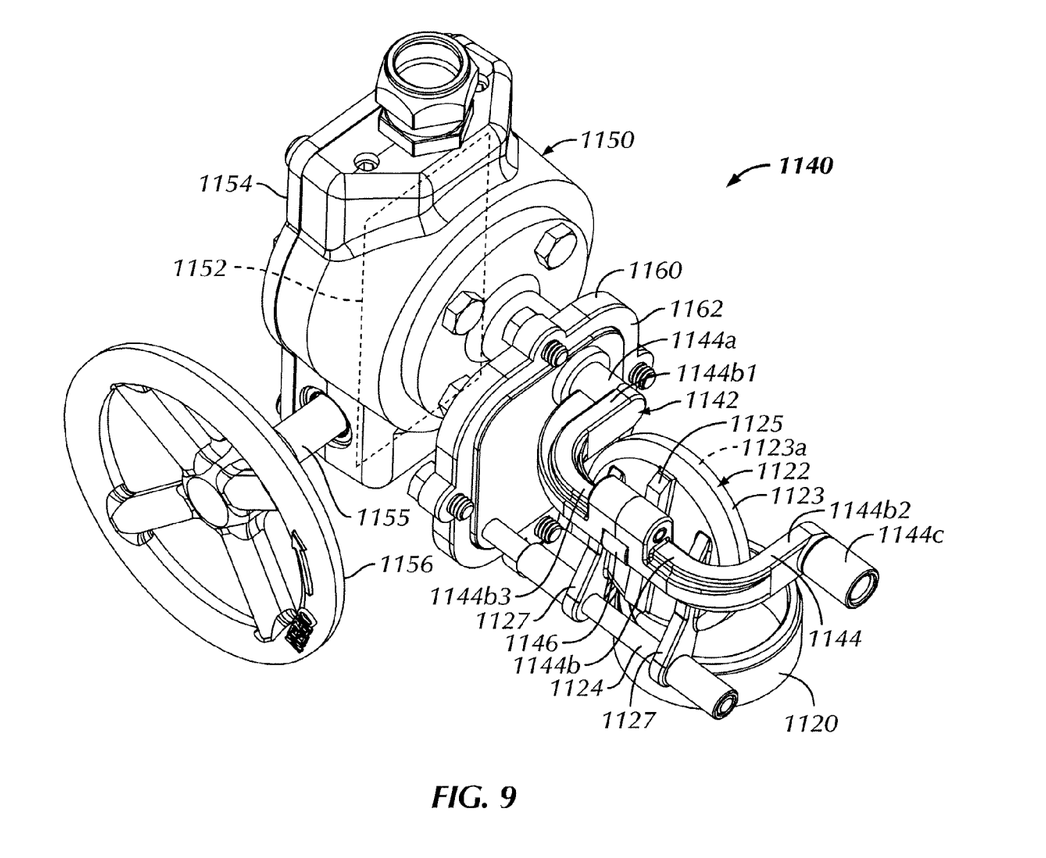
FIG. 9 is a perspective view of the positioner and an actuator of the modular valve assembly of FIG. 1 without the valve body, in the open position of the clapper.
Figure 10:
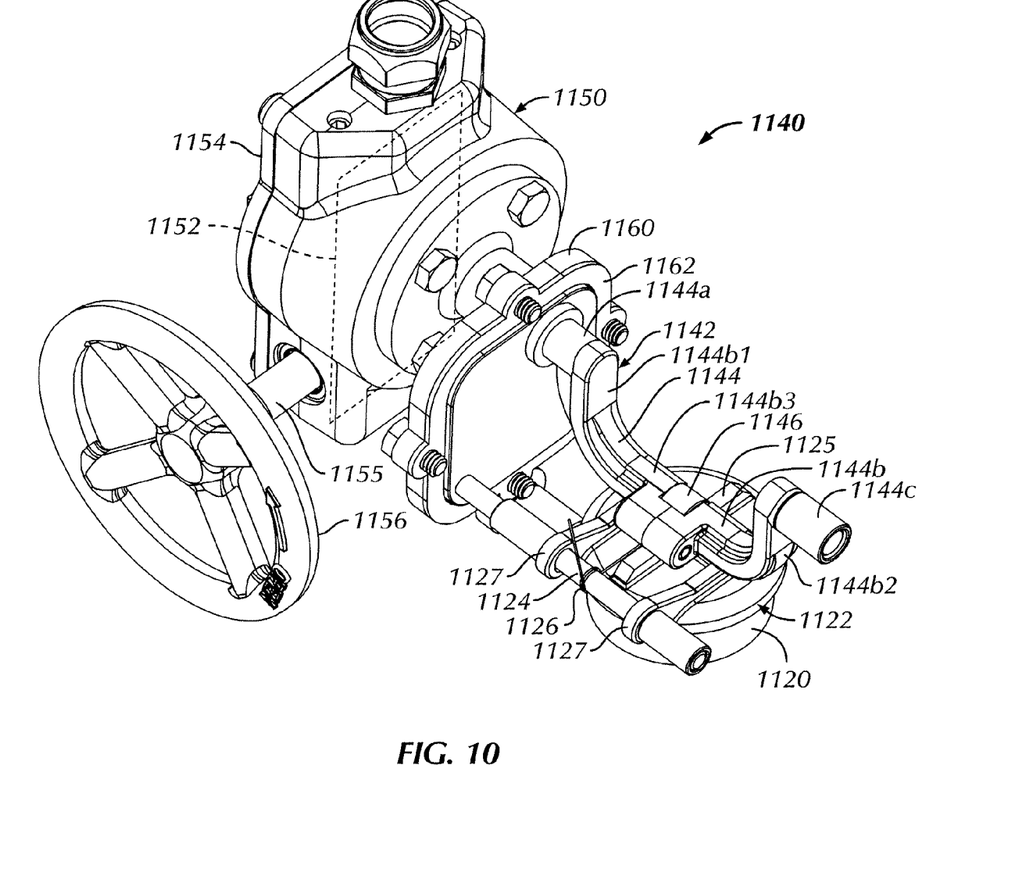
FIG. 10 is a perspective view of the positioner and the actuator of the modular valve assembly of FIG. 1 without the valve body, in the closed position of the clapper.

The valve assembly 1110 includes a valve body 1112 having an inlet end 1114 with an inlet opening 1115 and an opposing outlet end 1116 with an outlet opening 1117. In the illustrated embodiment, either end 1114, 1116 has an outer peripheral groove for mating in a conventional fashion with other fittings or pipe lengths. Alternatively, however, the ends may be threaded, flanged or the like, for other types of conventional mating. An opening 1113 is provided in the sidewall of the valve body 1112 to receive a control mechanism indicated generally at 1140 (FIGS. 9, 10). In the illustrated embodiment, four threaded bores are also provided into the valve body 1112. One bore 1138 (FIG. 4) receives a water flow switch assembly indicated generally at 1170. Another bore 1136 (FIG. 2) receives an input/upstream pressure gauge 1182. A third bore 1134 (FIGS. 2, 4) receives an output/downstream pressure gauge 1184. The fourth bore 1132 (FIG. 2) receives a valve test/drain assembly indicated generally at 1190. The valve test/drain assembly 1190 is required for performance tests and drainage of the valve and includes a simple on/off valve 1192 in a pipe 1194 connected to the bore 1132 on the upstream side of a clapper disk 1122 (discussed further below) near the bottom of the clapper chamber of the valve body 1112. It will be appreciated that any and all of the four threaded bores can be located elsewhere circumferentially about the valve body 1112 and above or below their indicated positions to perform their intended function. For example, bore 1136 may be located 180 degrees from its indicated position on the other side of the body for easier access. As should also be understood, the valve body 1112 may include more or less than four bores, and any unused bores may be sealed, e.g., via a plug.

As shown in FIGS. 1-4, each pressure gauge 1182, 1184 is connected to the interior of the valve body 1112 through a valve 1186. Three way ball valves 1186 are suggested having OFF (no orifice), TEST (restricted orifice) and OPERATION (full open orifice) positions but simple two-way, on (full orifice)/off and test (restricted orifice)/off valves may be used instead, in sequence. Instead of an elbow 1188 to each separate gauge 1182 or 1184, a Tee may be substituted so that another pressure gauge (neither depicted) might be connected with the upstream and/or downstream side of the valve body 1112 for independent pressure testing of the valve and/or calibration of the existing gauges 1182, 1184. One of the two output sides of the Tee would be plugged when an additional gauge is not being provided.

Still referring to FIGS. 1-4, a valve actuator assembly 1150 includes a transmission 1152 (shown schematically in FIGS. 9, 10), e.g., a conventional, commercially available, worm gear transmission, in a housing 1154 with a control arm 1155 rotatable by a hand wheel 1156 connected thereto. The transmission 1152 provides a relatively large reduction ratio, for example sixty-to-one, for reasons that will become apparent.

Turning to FIGS. 5-8, details of the internals of the valve body 1112 are shown. An endless, preferably annular, valve seat 1120 is provided within the valve body 1112, extending around an inner circumference thereof, to mate with the clapper disk 1122. The opening 1113 (with removable cover plate 1160 as explained further below) is provided in the side wall of the valve body 1112 to assist in installing the valve seat 1120 and/or the clapper disk 1122 and for future inspection, maintenance and/or repair after installation.

The clapper disk 1122 has a metal body 1123 pivotally mounted on a pin 1124. A molded, flexibly resilient skirt 1128 of a conventional material such as EPDM is attached to the metal body 1123 facing the input end 1114 (upstream side) of the valve body 1112. The clapper disk 1122 is pivotable between open (FIG. 5) and closed (FIG. 7) positions. As should be understood by those of ordinary skill in the art, in the closed position of the clapper disk 1122, the clapper disk 1122 sealingly engages the valve seat 1120 and prevents the flow of liquid therethrough, and in the open position of the clapper disk 1122, the clapper disk 1122 is pivoted away from the valve seat 1120 and liquid is permitted to flow from the inlet end 1114 to the outlet end 1116.

As shown best in FIGS. 9 and 10, a positioner is indicated generally at 1142 and includes a U-shaped arm 1144 rotatably supported in the valve body 1112. In the illustrated embodiment, the U-shaped arm 1144 includes a first section 1144a, a second section 1144b and a third section 1144c positioned in series. The first and third sections 1144a, 1144c are linearly extending. The second section 1144b includes a first arm 1144b1 extending generally transversely from the first section 1144a, a second arm 1144b2 extending generally transversely from the third section 1144c and a third arm 1144b3 extending between the first and second arms 1144b1, 1144b2. The second section 1144b defines the bight of the U-shaped arm 1144.

The U-shaped arm 1144 mounts a roller 1146 in the center of the bight thereof. The roller 1146 is aligned with a load bearing ridge 1125 along the centerline of the output end/downstream side of the clapper metal body 1123 opposite the side facing skirt 1128. As shown, the clapper disk 1122 and the positioner 1142 are part of a valve control mechanism 1140 subassembly including the valve actuator assembly 1150, supported on a mounting plate 1160. The mounting plate 1160 also covers the large opening 1113 provided in the sidewall of the body 1112. A gasket 1162 seals the cover 1160 with the valve body 1112.

One end of the U-shaped arm 1144 distal to the plate 1160 (i.e., the free end of the third section 1144c) is journaled in a blind bore (not shown) in a boss 1145 (FIGS. 3, 4) of the valve body 1112 opposite the mounting plate 1160. One end of the pin 1124 supporting the clapper disk 1122 is similarly supported, but in an internal boss (not depicted). The opposing end of the U-shaped arm 1144 (i.e., the free end of the first section 1144a) extends into the transmission housing 1154, through the mounting plate 1160, and forms the output shaft of the transmission 1152. The remaining end of the pin 1124 is journaled into the cover 1160.

A torsion spring 1126 (only shown in FIG. 10 for clarity of the remaining components) is also provided on the pin 1124 to bias the clapper disk 1122 against the seat 1120, i.e., the closed position. In the illustrated embodiment, the assembly 1110 is depicted as it would be installed in a vertical supply riser with upward water flow. In the absence of a pressure differential, the weight of the clapper disk 1122 would keep the clapper disk 1122 pivoted to the closed position. The torsion spring 1126 biases the clapper disk 1122 to the closed position against the seat 1120 so that the assembly 1110 might be installed horizontally in any angular position or inverted for water flow in the opposite direction. With water flow through the body 1112, for example, from activation of one or more downstream sprinklers, the pressure differential across the clapper disk forces the clapper disk 1122 away from the seat 1120.

Figure 6:
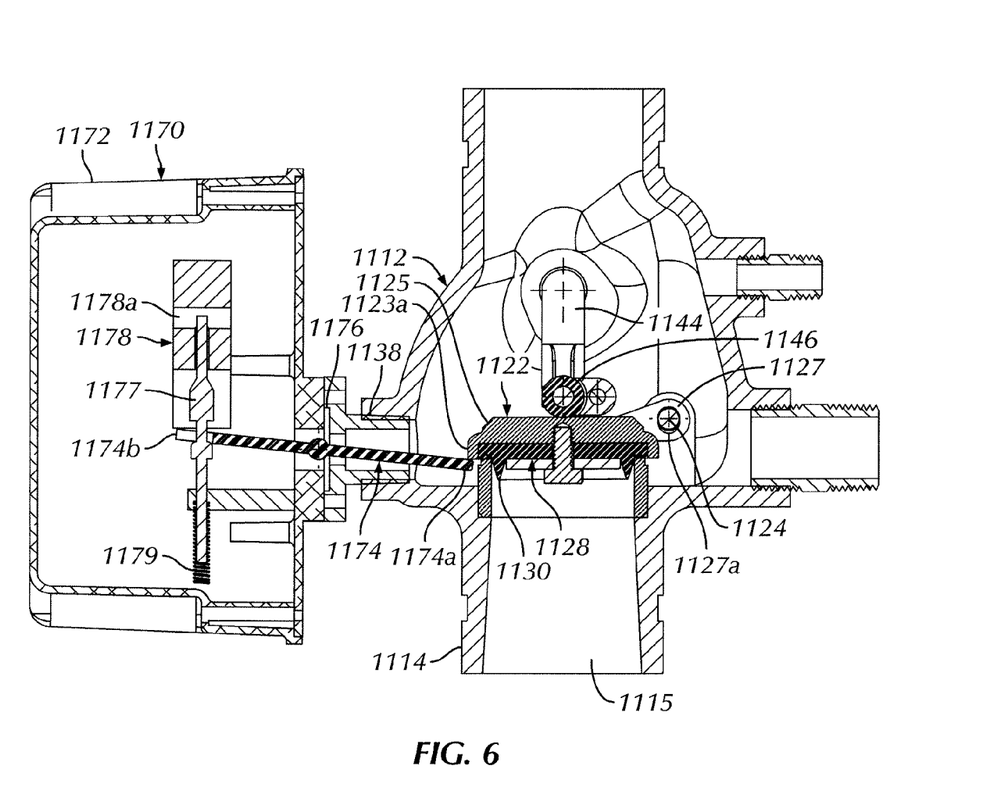
FIG. 6 is a partial, cross-sectional elevational view of the modular valve assembly of FIG. 1, taken along sectional line 5-5 of FIG. 1, with the clapper in a manually closed position by a positioner of the valve assembly.
Figure 7:
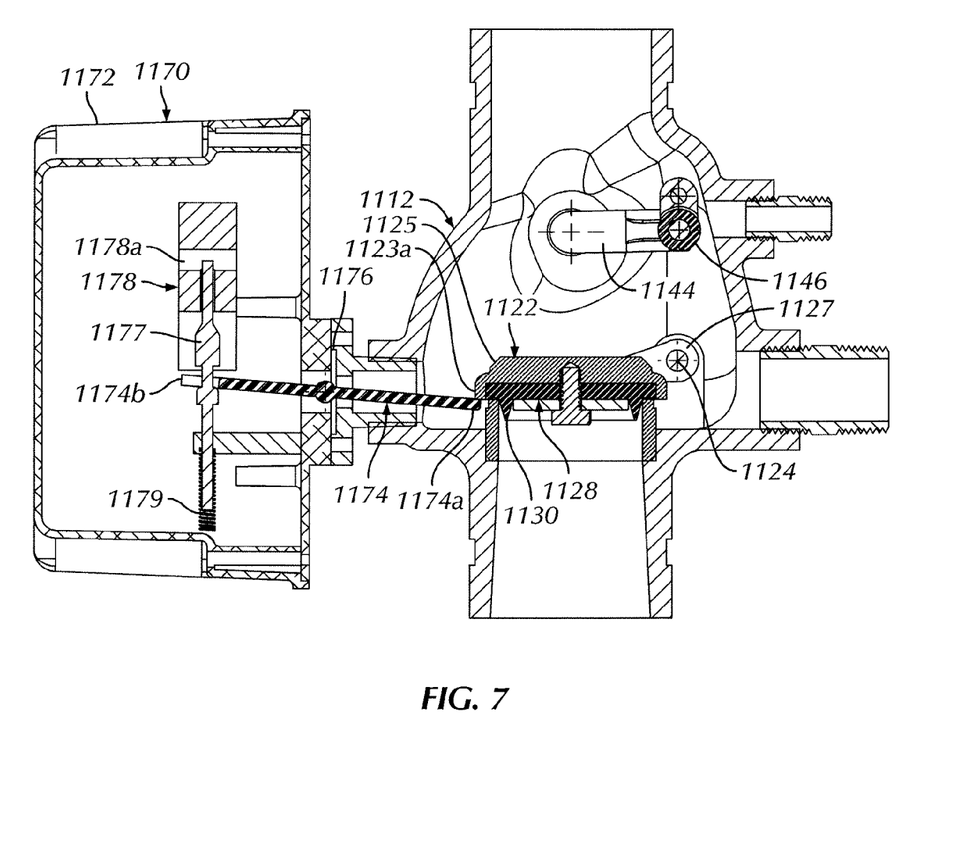
FIG. 7 is a partial, cross-sectional elevational view of the modular valve assembly of FIG. 1, taken along sectional line 5-5 of FIG. 1, with the clapper in a closed position due to pressure differential across the clapper.

The roller 1146 is supported on the U-shaped arm 1144 such that it remains in contact with the load bearing ridge 1125 throughout the entire ninety degree movement of the arm 1144. Referring to FIG. 6, it can be seen that with the clapper disk 1122 in the fully closed position, the centerline of the ends of the arm 1144 lie above the centerline of the roller 1146 and above the transverse centerline of the seal 1130 and the seat 1120 so that there is no moment arm on the roller 1146 or the clapper disk 1122. As is also shown in FIG. 6, the bores 1127a through each of the clapper support arms 1127 that receive pin 1124 are preferably oval in shape so that the clapper disk 1122 can be vertically displaced and the seal 1130 compressed against the seat 1120.

Valves for fire protection systems are normally rated at 175 or 300 psi operating pressure. To obtain testing laboratory approvals for fire protection systems, the valves are cycled repeatedly at twice the rated pressure for leakage. The seat of an eight inch valve has a surface area of slightly more than two hundred square inches. Six hundred psi for a three hundred psi rating, imposes a load on two hundred square inches of about thirty-thousand pounds. The worm gear transmission 1152 of the valve actuator assembly 1150 provides the necessary mechanical advantage to manually open and close the valve under such conditions.

When the control valve assembly 1110 is employed in a fire protection sprinkler system, the valve body 1112 is filled with water and pressurized at all times. Under normal operation, water pressure differential across the clapper disk 1122 maintains the clapper disk 1122 in the closed position, i.e., water pressure is greater on the outlet end 1116 than the inlet end 1114. A decrease in the water pressure on the outlet end 1116 (such as by a sprinkler opening) pivots the clapper disk 1122 to the open position, for water to flow through the valve body 1112 from the inlet end 1114, past the open clapper disk 1122 and to the outlet end 1116.

Under certain circumstances, the clapper disk 1122 may be required to be manually shut, e.g., for maintenance purposes. The hand wheel 1156 is operatively connected with the clapper disk 1122 through the U-shaped arm 1144. Namely, the hand wheel 1156 of the control arm 1155 is operatively coupled via the transmission 1152 within the transmission housing 1154, to the U-shaped arm 1144. Manual clockwise and counterclockwise rotation of the hand wheel 1156 rotates the U-shaped arm 1144 through ninety degrees, via the transmission 1152, between a generally horizontal orientation (FIGS. 7-9) and a generally vertical orientation (FIGS. 6, 10).

In the horizontal position, the U-Shaped arm 1144 is rotated out of the operational range of movement of the clapper disk 1122, such that the clapper disk 1122 is free to move between the open and closed positions thereof, depending on the pressure differential across the clapper disk 1122. In the vertical orientation, the U-shaped arm 1144 engages the clapper disk 1122 and orients the clapper disk 1122 into the closed position thereof, irrespective of pressure differential within the valve body 1112. In the vertical orientation of the U-shaped arm 1144, the roller 1146 engages the load bearing ridge 1125 to move the clapper disk 1122 into the closed position thereof. Therefore, a user can selectively rotate the hand wheel 1156 to move the U-shaped arm 1144 between the horizontal and vertical positions, to manually close the clapper disk 1122 when required.

FIGS. 5-8 also show further details and operation of the water flow switch assembly 1170 mounted to threaded bore 1138. The assembly 1170 includes a pivotally mounted actuator arm 1174, one end 1174a of which extends into the valve body 1112 and the other end 1174b of which moves the actuator 1177 of a momentary electrical switch 1178, the contacts of which are indicated diagrammatically at 1178a. The switch actuator 1177 is normally biased away from the contacts 1178a to the position shown in FIG. 5 by a tensioned spring 1179. A conventional seal 1176 separates the interior of the housing 1172 from that of the valve body 1112.

Figure 1:
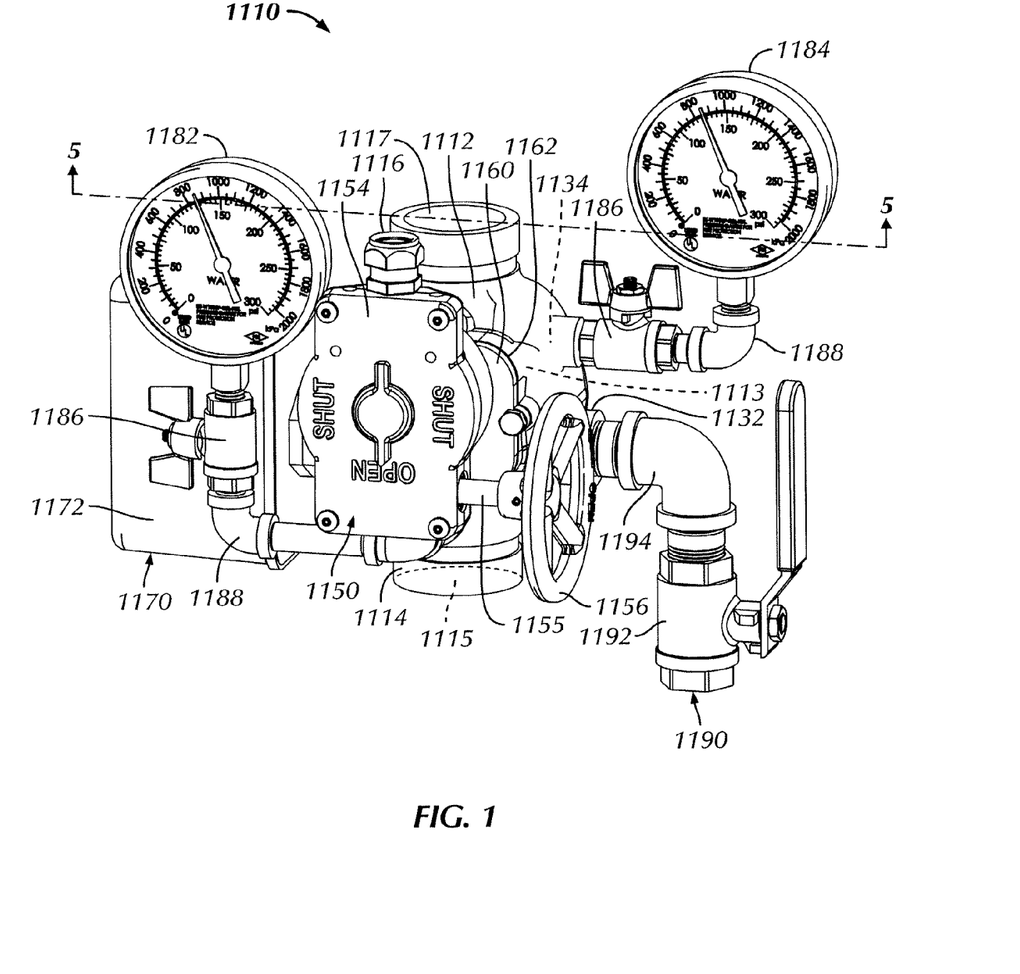
FIG. 1 is a front elevational view of a modular valve assembly of a preferred embodiment of the present invention, configured as a stop-check type control valve.
Figure 2:
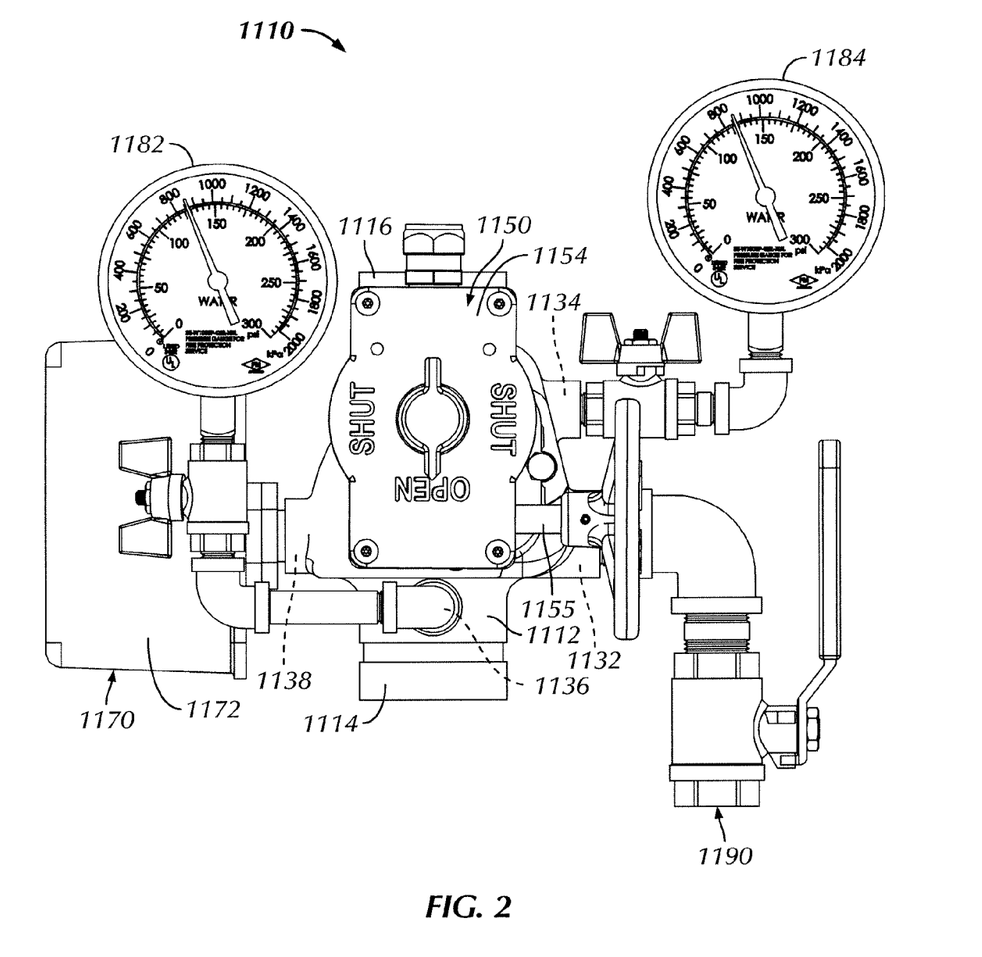
FIG. 2 is a front elevational view of the modular valve assembly of FIG. 1.
Figure 3:
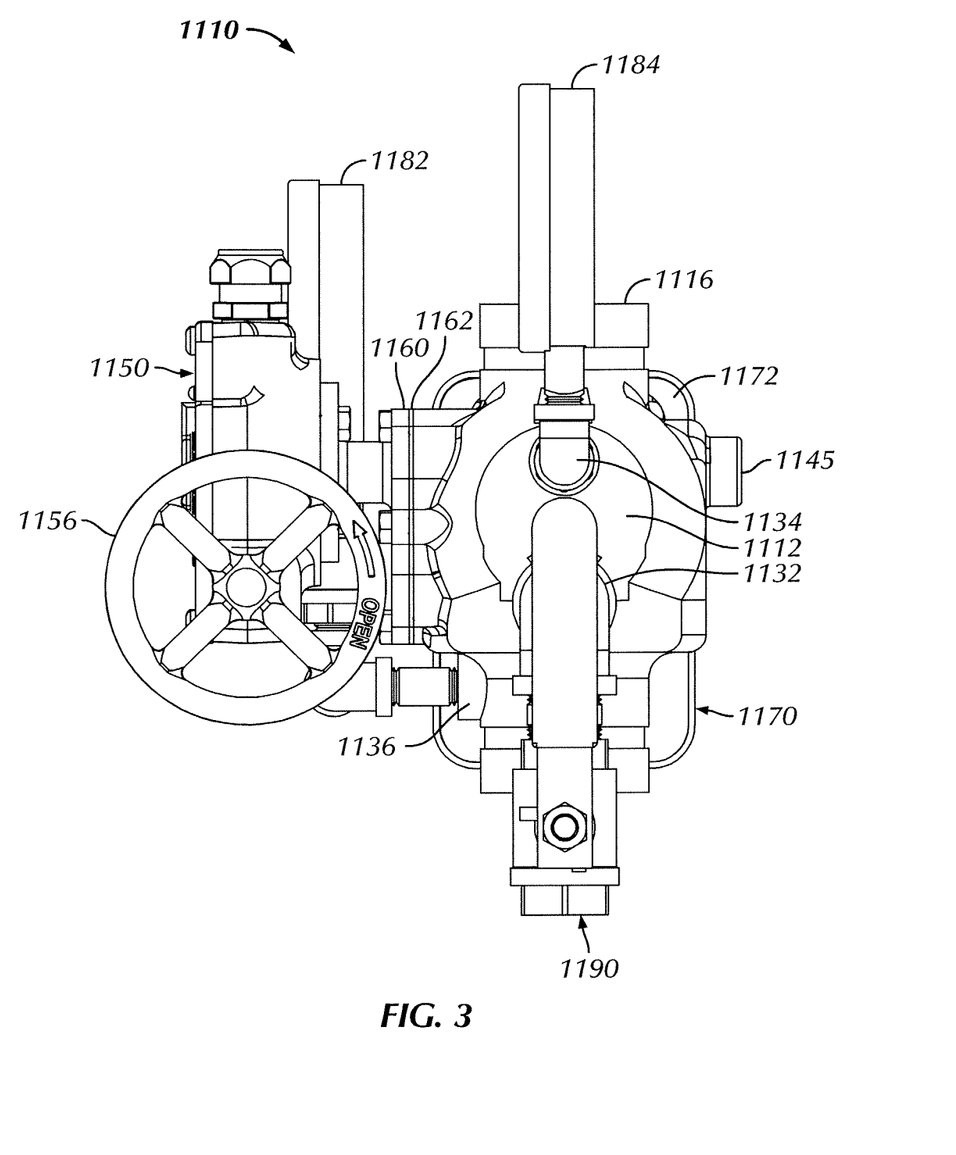
FIG. 3 is a right side elevational view of the modular valve assembly of FIG. 1.
Figure 4:
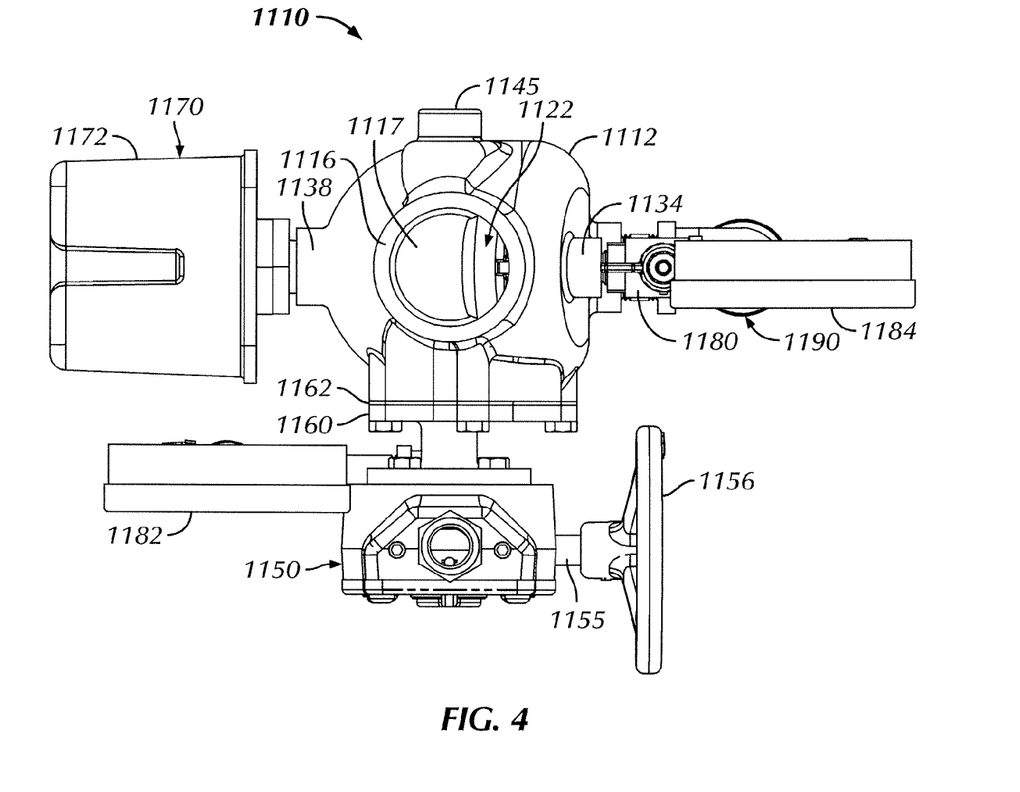
FIG. 4 is a top plan view of the modular valve assembly of FIG. 1.
Figure 5:
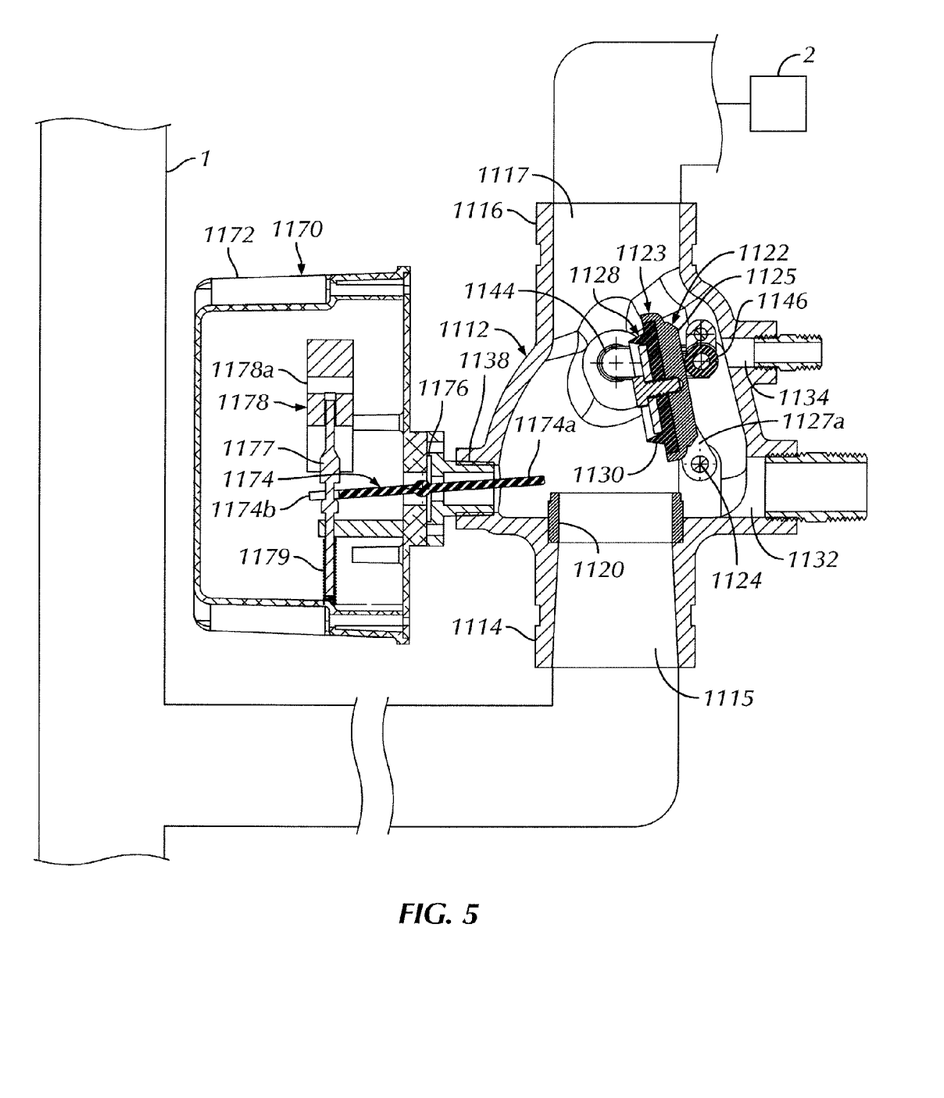
FIG. 5 is a partial, cross-sectional elevational view of the modular valve assembly of FIG. 1, taken along sectional line 5-5 of FIG. 1, with a clapper of the valve assembly in a fully opened position.

The water flow switch assembly 1170 is an integral part of the valve assembly 1110 and operates in conjunction with the clapper disk 1122. FIG. 5 shows the valve in the tripped or clapper fully open condition and the switch actuator 1177 pulled away from contacts 1178a by spring 1179. FIG. 6 depicts rotation of the positioner arm 1144 ninety degrees (by operation of the valve actuator 1150) to force the clapper disk 1122 shut, sealed against the seat 1120. In moving the clapper disk 1122, end 1174a of the pivot arm 1174 is contacted by an extended lip area 1123a of the clapper disk 1122 and pivoted downwardly in the figure to pivot the remaining end 1174b of the arm upwardly and switch actuator 1177 against contacts 1178a. When the valve is stable closed, with equal pressure on both sides of the clapper disk 1122 or higher pressure on the downstream side, the positioner arm 1144 is rotated counterclockwise from the FIG. 6 position to the FIG. 7 position to permit check operation of the clapper disk 1122.

Figure 8:
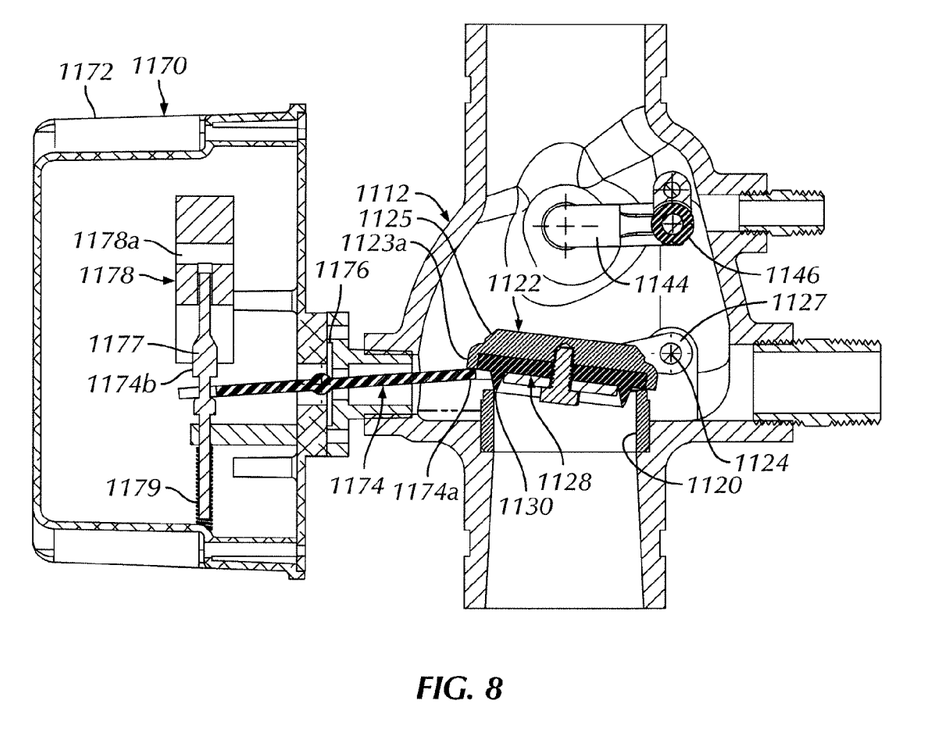
FIG. 8 is a partial, cross-sectional elevational view of the modular valve assembly of FIG. 1, taken along sectional line 5-5 of FIG. 1, with the clapper in a partially opened position.

FIG. 8 illustrates initial tripping of the check valve caused by a pressure differential across the clapper disk 1122, for example from activation of a sprinkler head connected with the output end 1116 of the valve body 1112. The skirt 1128 is shaped to clear the inner walls of the seat 1120 when the clapper disk 1122 is opening and closing and to further elevate the clapper disk 1122 to a height which permits the pivot arm 1174 to rotate and change the state of switch 1178 when flow through the valve is at least ten gallons per minute (10 GPM), a minimum flow required by fire codes and testing laboratories, but not change the switch state at a flow rate less than four gallons per minute (4 GPM). This is accomplished by shaping the skirt to restrict the water so that water flows or essentially flows past the skirt 1128 through narrow spaces formed between the seat 1120 and only portions of the perimeter of the skirt 1120, in particular, side edge portions of the skirt 1128 between the distal and proximal edge portions of the skirt 1128 seen in the cross sections in FIGS. 5-8, as the clapper disk 1122 rises. Up-down movement of the end 1174*a* of pivot arm 1174 of one-half inch or less is suggested and preferably only about one-eighth inch should be required to change the state of the switch 1178.

The signaling and any delay activation components of the flow switch assembly 1170 are conventional and omitted from the figures for clarity. It will be appreciated that those skilled in the art will know how to modify and supplement the basic clapper-seat combination to provide a hydraulically powered alarm as well as dry pipe and deluge type fire sprinkler system valves.

It will also be appreciated that modular assembly 1110 can be configured as a stop-check type control valve without a flow switch and/or without the test and drain components or as simply a swing type check valve with or without flow switch and/or test and drain accessories by replacing the mounting plate with clapper disk 1122 and valve control mechanism with a simple cover plate supporting the through pin which supports the clapper disk 1122. The flow switch assembly 1170 continues to work with the clapper disk in a check valve configuration. Finally, the assembly could be configured as a dedicated control valve by replacing the load bearing ridge 1125 with a slotted ridge receiving roller 1146 on arm 1144.

Typically, an installer/repair person ("fitter") who wants to work on an existing system with a paddle type flow switch, and who does not want to ring the alarm bells and/or notify the monitoring station or Fire Department, usually pulls the cover off of the water flow switch assembly and sticks a screwdriver or piece of cardboard to stop the flow switch from activating while working on the system. This is not the most desirable method. Ideally, the fitter should go to the fire panel and put the panel in test mode and/or call the monitoring service and let them know that work will be performed on the system. However, with a check-close control valve of the present invention, the fitter needs only to 'close' the control which will keep the flow switch from operating. In both scenarios a tamper switch (not shown) operates indicating the control valve is closed but that is a local indication at the fire panel without the extremely loud bells/sirens triggered by the flow switch which generally clears an entire building.

The invention is therefore a multipurpose valve assembly of modular construction with a single valve body provided for each code designated pipe size and configured, as desired, as a simple swing-type check valve, a check valve with closure control feature (stop-check valve) or even a dedicated control valve, any with or without a flow switch and/or with or without test and drain components.

It will be appreciated by those skilled in the art that changes could be made to the embodiments described above without departing from the broad inventive concept thereof.

For example, although the use of the present invention is disclosed as a valve assembly for fire protection sprinkler systems, it will be appreciated that the modular valve assemblies of the present invention would have wide application in the control and monitoring of other fluids in other fields. It is understood, therefore, that this invention is not limited to the particular embodiments disclosed, but it is intended to cover modifications within the spirit and scope of the present invention, as set forth in the appended claims.

We claim:

1. A fire protection system comprising:
   at least one control valve assembly comprising:
     a valve body having an inlet end, an outlet end, an endless valve seat therebetween and a clapper disk pivotably mounted within the valve body, the clapper disk being pivotable between a closed position and an open position according to a pressure differential across the clapper disk, the clapper disk being in sealed engagement with the valve seat in the closed position thereof and the clapper disk being spaced away from the valve seat in the open position thereof;
     a U-shaped arm rotatably supported in the valve body, the U-shaped arm being rotatable between a first position wherein a bight of the U-shaped arm is positioned out of an operational range of movement of the clapper disk such that the clapper disk is freely movable between the open and closed positions thereof according to the pressure differential across the clapper disk, and a second position wherein the bight of the U-shaped arm engages and maintains the clapper disk in the closed position thereof irrespective of the pressure differential across the clapper disk;
     the valve body further including an opening in a sidewall thereof, the opening being sized and dimensioned to clear passage of each of the valve seat, the clapper disk and the U-shaped arm therethrough, and a mounting plate removably and sealingly mountable on the valve body to cover the opening; and
     a selectively rotatable control arm operatively coupled with the U-shaped arm to move the U-shaped arm between the first and second positions thereof; and
     a transmission positioned outside of the valve body, operatively coupling the control arm and the U-shaped arm, a first end of U-shaped arm extending outside of the valve body, through the mounting plate and into the transmission for operative coupling with the control arm, and a second end of the U-shaped arm being journaled in a sidewall of the valve body opposite the mounting plate;
   a wet standpipe, the inlet end of the valve body being fluidly connected with the standpipe; and
   at least one sprinkler downstream of the at least one control valve assembly, the at least one sprinkler being fluidly connected with the outlet end of the valve body.

2. The fire protection system of claim 1, wherein the U-shaped arm comprises a first section, a second section and a third section positioned in series, the first and third sections being linearly extending, the second section including a first arm extending generally transversely from the first section, a second arm extending generally transversely from the third section and a third arm extending between the first and second arms to define the U-shaped arm, the second section defining the bight of the U-shaped arm.

3. The first protection system of claim 1, wherein the U-shaped arm is removably supported in the valve body.

4. The fire protection system of claim 1, wherein the U-shaped arm rotates substantially 90 degrees between the first and second positions.

5. The fire protection system of claim 1, wherein the valve body further comprises a bore in a sidewall thereof, and the at least one control valve assembly further comprises a water flow switch removably coupled thereto.

6. The fire protection system of claim 1, wherein the valve body further comprises a bore in a sidewall thereof, and the at least one control valve assembly further comprises a pressure gauge removably coupled thereto.

7. The fire protection system of claim 1, wherein the valve body further comprises a bore in a sidewall thereof, and the at least one control valve assembly further comprises a test and drain assembly removably coupled thereto.

8. The fire protection system of claim 1, wherein the control arm comprises a manually rotatable hand wheel.

9. The fire protection system of claim 1, wherein the at least one control valve assembly further comprises a torsion spring biasing the clapper disk into the closed position.

10. The fire protection system of claim 1, wherein the clapper disk is angularly spaced away from the valve seat in the open position thereof.

11. A control valve assembly comprising:
a valve body having an inlet end, an outlet end, an endless valve seat therebetween and a clapper disk pivotably mounted within the valve body, the clapper disk being pivotable between a closed position and an open position according to a pressure differential across the clapper disk, the clapper disk being in sealed engagement with the valve seat in the closed position thereof and the clapper disk being spaced away from the valve seat in the open position thereof;
a U-shaped arm rotatably supported in the valve body, the U-shaped arm being rotatable between a first position wherein a bight of the U-shaped arm is positioned out of an operational range of movement of the clapper disk such that the clapper disk is freely movable between the open and closed positions thereof according to the pressure differential across the clapper disk, and a second position wherein the bight of the U-shaped arm engages and maintains the clapper disk in the closed position thereof irrespective of the pressure differential across the clapper disk;
the valve body further including an opening in a sidewall thereof, the opening being sized and dimensioned to clear passage of each of the valve seat, the clapper disk and the U-shaped arm therethrough, and a mounting plate removably and sealingly mountable on the valve body to cover the opening; and
a selectively rotatable control arm operatively coupled with the U-shaped arm to move the U-shaped arm between the first and second positions thereof; and
a transmission positioned outside of the valve body, operatively coupling the control arm and the U-shaped arm, a first end of U-shaped arm extending outside of the valve body, through the mounting plate and into the transmission for operative coupling with the control arm, and a second end of the U-shaped arm being journaled in a sidewall of the valve body opposite the mounting plate.

12. The control valve assembly of claim 11, wherein the U-shaped arm comprises a first section, a second section and a third section positioned in series, the first and third sections being linearly extending, the second section including a first arm extending generally transversely from the first section, a second arm extending generally transversely from the third section and a third arm extending between the first and second arms to define the U-shaped arm, the second section defining the bight of the U-shaped arm.

13. The control valve assembly of claim 11, wherein the U-Shaped arm includes a roller mounted to the bight thereof, the roller being aligned with a load bearing ridge of the clapper disk to engage the load bearing ridge and pivot the clapper disk from the open position to the closed position thereof during rotation of the U-shaped arm from the first position to the second position thereof.

14. The control valve assembly of claim 11, further comprising a torsion spring biasing the clapper disk into the closed position.

15. The control valve assembly of claim 11, wherein the U-shaped arm rotates substantially 90 degrees between the first and second positions.

16. The control valve assembly of claim 11, wherein the valve body further comprises a bore in a sidewall thereof, and a water flow switch is removably coupled thereto.

17. The control valve assembly of claim 11, wherein the valve body further comprises a bore in a sidewall thereof, and a test and drain assembly is removably coupled thereto.

18. The control valve assembly of claim 11, wherein the control arm comprises a manually rotatable hand wheel.

19. The control valve assembly of claim 11, wherein the clapper disk is angularly spaced away from the valve seat in the open position thereof.

20. The control valve assembly of claim 11, wherein the U-shaped arm is removably supported in the valve body.

* * * * *